(12) United States Patent
Nayar et al.

(10) Patent No.: US 7,694,411 B2
(45) Date of Patent: Apr. 13, 2010

(54) FIXTURING A HEAD SPINDLE ASSEMBLY WITH AN EXPANDING COLLET

(75) Inventors: Sham Sunder Nayar, Savage, MN (US); John George Gerogeorge, Chanhassen, MN (US); Mark Curtis Fahrendorff, New Prague, MN (US); Ronald Jacob Smith, Belle Plaine, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 214 days.

(21) Appl. No.: 11/789,491

(22) Filed: Apr. 23, 2007

(65) Prior Publication Data

US 2008/0256791 A1 Oct. 23, 2008

(51) Int. Cl.
*G11C 5/12* (2006.01)
*B23P 19/00* (2006.01)

(52) U.S. Cl. .................. 29/737; 29/603.03; 29/603.01; 29/603.04; 29/729; 29/783; 360/81; 360/110; 360/240; 360/900; 279/2.02; 279/2.03; 279/2.1; 279/2.11; 279/2.12

(58) Field of Classification Search .............. 29/603.01, 29/603.03, 603.04, 729, 737, 783, 787, 789, 29/791, 795; 360/81, 110, 240, 900; 279/2.02, 279/2.03, 2.1, 2.11, 2.12
See application file for complete search history.

(56) References Cited

U.S. PATENT DOCUMENTS

| | | | | |
|---|---|---|---|---|
| 3,885,295 A | * | 5/1975 | Engelberger et al. | .......... 29/429 |
| 4,528,453 A | | 7/1985 | Heller | |
| 5,275,424 A | * | 1/1994 | Watanabe | .................. 279/2.03 |
| 5,560,624 A | * | 10/1996 | Williams et al. | ........... 279/2.03 |
| 5,722,806 A | * | 3/1998 | Erickson et al. | ............. 409/233 |
| 5,929,987 A | | 7/1999 | Hayes | |
| 5,959,450 A | | 9/1999 | Moroe et al. | |
| 5,980,172 A | * | 11/1999 | Shoda | ........................ 409/203 |
| 5,987,735 A | * | 11/1999 | Horning et al. | ................ 29/737 |
| 7,021,097 B1 | | 4/2006 | Ubl et al. | |
| 7,027,141 B2 | | 4/2006 | Girard et al. | |
| 7,069,156 B2 | | 6/2006 | Zeng | |
| 7,082,670 B2 | | 8/2006 | Boismier et al. | |
| 2002/0069510 A1 | | 6/2002 | Girard et al. | |
| 2002/0135926 A1 | | 9/2002 | Girard | |
| 2004/0208440 A1 | | 10/2004 | Tateiwa | |
| 2004/0231139 A1 | | 11/2004 | Jurgenson | |
| 2005/0082770 A1 | * | 4/2005 | Siev et al. | .................. 279/2.03 |
| 2006/0002028 A1 | | 1/2006 | Nayar et al. | |
| 2006/0072381 A1 | | 4/2006 | Girard et al. | |
| 2006/0109453 A1 | | 5/2006 | Swift et al. | |

* cited by examiner

*Primary Examiner*—Derris H Banks
*Assistant Examiner*—Jeffrey Carley
(74) *Attorney, Agent, or Firm*—Fellers, Snider, et al.

(57) ABSTRACT

An apparatus and associated method is provided for precisely positioning a datum surface of a component. The apparatus has a housing defining a tooling datum surface. A collet is supported by the housing that is selectively operable between a retracted mode and an expanded mode. In the retracted mode a clearing disengagement is defined with the component. In the expanded mode a contacting engagement with the component is defined. The contacting engagement and a simultaneous longitudinal force transferred by the contacting engagement to the component pressingly engage the datum surfaces together. The apparatus further has a bias member exerting the longitudinal force and urging the collet to the retracted mode.

17 Claims, 6 Drawing Sheets

FIXTURING A HEAD SPINDLE ASSEMBLY WITH AN EXPANDING COLLET

BACKGROUND

Approaches used in performing precise operations on components and component assemblies have necessarily adapted to rapidly changing events affecting factory processes. For example, as miniaturization has proliferated in the electronics market the sheer size of the components and assemblies has rendered some past measurement approaches obsolete. Also, although electronics packages are continually shrinking, the converse is generally true for the feature sets being offered. That is, a predominant demand driving the electronics market now and for the foreseeable future is for more complex and capable devices in ever-smaller sizes.

To keep pace with this evolving market, manufacturers have replaced static measuring tools and fixtures with highly complex processor controlled measurement systems. Successful efforts have also been employed to reengineer the factory to build quality into the process rather than inspect quality into the product.

These and other recent improvements in the art have significantly improved not only the ability to perform precise measurements, but have also forged gains in the often competing goals of enhanced quality and faster throughput. It is to the furthering of those efforts that the embodiments of the present invention are directed.

SUMMARY

Embodiments of the present invention are generally directed to instrumentation devices used in a manufacturing process.

In some embodiments an apparatus and associated method are provided for precisely positioning a datum surface of a component. The apparatus has a housing defining a tooling datum surface. A collet is supported by the housing that is selectively operable between a retracted mode and an expanded mode. In the retracted mode a clearing disengagement is defined with the component. In the expanded mode a contacting engagement with the component is defined. The contacting engagement and a longitudinal force transferred by the contacting engagement to the component pressingly engage the datum surfaces together. The apparatus further has a bias member exerting the longitudinal force and urging the collet to the retracted mode.

These and various other features and advantages which characterize the claimed embodiments will become apparent upon reading the following detailed description and upon reviewing the associated drawings.

DETAILED DESCRIPTION

Figure 1:
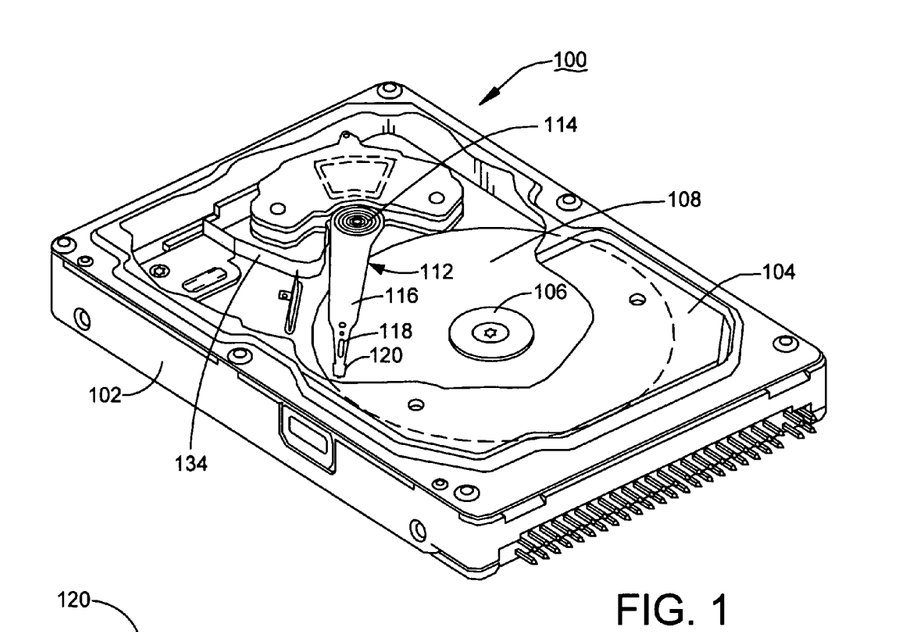
FIG. 1 is an isometric view of a data storage device suited for using embodiments of the present invention.

Referring to the drawings in general, and more particularly to FIG. 1 that shows an isometric view of a data storage device 100 (or "drive") suited for using embodiments of the present invention. Although the illustrative embodiments describe fixturing of components in the data storage device 100, the claims are not so limited. The claimed subject matter can be practiced on other types of components where precise measurements and/or positioning is needed in alternative equivalent embodiments.

The drive 100 preferably includes a base 102 and a cover 104 (partially cutaway), which together provide a housing for a number of components. The components include a motor to which a clamp 106 is attached for fixing one or more storage mediums 108 (or "discs") in rotation therewith. Adjacent the disc 108 is an actuator 112 that is pivotable around a spindle bearing 114 by selectively energizing a voice coil motor ("VCM") 115.

The actuator 112 includes an arm 116 supporting a suspension 118 that, in turn, supports a head 120 (or "transducer") at a distal end thereof in a data transfer relationship with the disc 108. The actuator 112, bearing 114, and head 120 are typically attached to the drive 100 as a subassembly component referred to as a head stack assembly ("HSA") 122.

Figure 2:
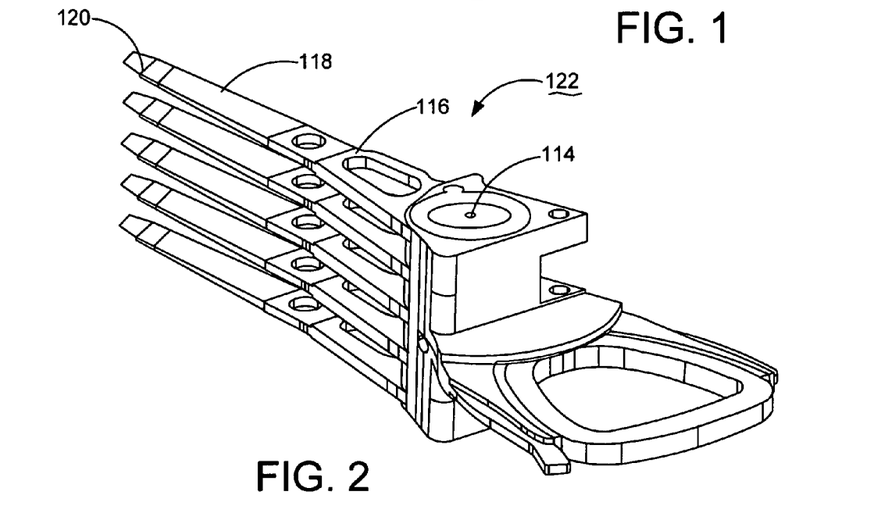
FIG. 2 is an isometric view of the head stack assembly in the device of FIG. 1.

FIG. 2 depicts an HSA 122 with multiple heads 120 used in a drive 100 having a stack of multiple discs 108, with one disc 108 operably disposed in each of the gaps between adjacent opposing heads 120 so that one head 120 is operably disposed adjacent each of the disc 108 surfaces.

Figure 3:
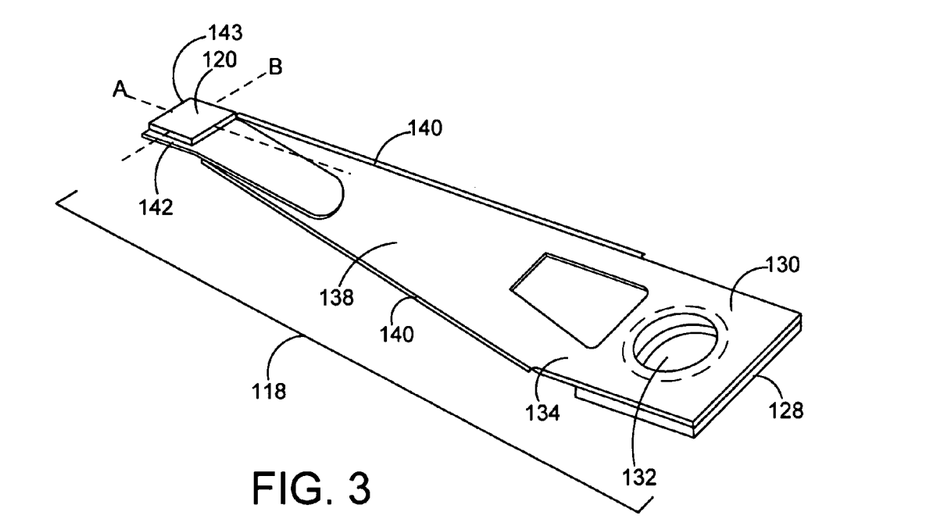
FIG. 3 is an isometric view of the suspension member of the head stack assembly of FIG. 2.

FIG. 3 is an isometric depiction of the suspension 118 that is attached at a proximal end 128 thereof to the arm 116. In these illustrated embodiments the suspension 118 has a mounting portion 130 defining an opening 132 that is sized to align with a mating feature on the arm 116 for fixing the two together, such as by swaging. In alternative equivalent embodiments other mounting features can be provided such as for adhering or welding the suspension 118 to the arm 116, and the like.

The suspension 118 has a spring section 134 that permits a predetermined flexure of the head 120 relative to the mounting section 130. The spring section 134 provides a preload bias of the head 120 toward the disc 108 when the disc 108 is not spinning, or in other words when the head 120 is in an unloaded state. The preload bias is countered by airflow pressure against the head 120 from the spinning disc 108 in the loaded state of the head 120. Balancing the preload bias and the airflow pressure results in a desired fly height of the head 120 adjacent the disc 108 in the loaded state. In the illustrated embodiments the spring section 134 defines an aperture 136 that reduces the cross sectional strength, and hence the rigidity, of the suspension 118 in the spring section 134.

A load beam 138 extends from the spring section 134. The load beam 138 has stiffening features, such as the formed rails 140, to ensure that all flexing occurs in the spring section 134.

A gimbal 142 is depicted as being attached to the load beam 138 at a distal end of the suspension 118. In alternative equivalent embodiments the gimbal 142 can be formed as a portion of the load beam 138, such as by etching it. A slider 143 is attached to the gimbal 142 and in turn supports the head 120.

In order to provide the desired fly height characteristics, the slider 143 is statically offset in relation to the mounting portion 130 within predetermined manufacturing tolerances. The unloaded position of the slider 143 is measured in terms of the pitch static attitude and roll static attitude. The pitch static attitude, or pitch aspect, is a measurement of the planar disposition of the slider 143 in relation to rotation around axis B. The roll static attitude, or roll aspect, is a measurement of the planar disposition of the slider 143 in relation to rotation around axis A.

It is imperative that the static offset of the slider 143 as well as its pitch and roll static attitude be verified during manufacturing. The present embodiments contemplate performing this verification after all the suspensions 118 have been longitudinally aligned and assembled into the HSA 122 level subassembly component of FIG. 2. Measuring these spatial characteristics in this manner yields comparatively more valuable information than measuring individual suspensions 118 as they exist in FIG. 3. This is due in part to the measurements being taken as the components will exist in the finally assembled drive 100. If these measurements are verified at the suspension 118 component level, then tolerance stacks and downstream operations can adversely affect the spatial characteristics, and yet go unchecked. Besides handling damage, for example, a shipping comb (not shown) is typically inserted between adjacent heads 120 to support them during transit, and to elastically separate adjacent heads 120 to form clearance gaps for merging the HSA 122 with the disc 108 stack. It is possible for the shipping comb insertion process to go awry so as to make the head 120 offset or pitch and roll static attitude out of tolerance.

Figure 4:
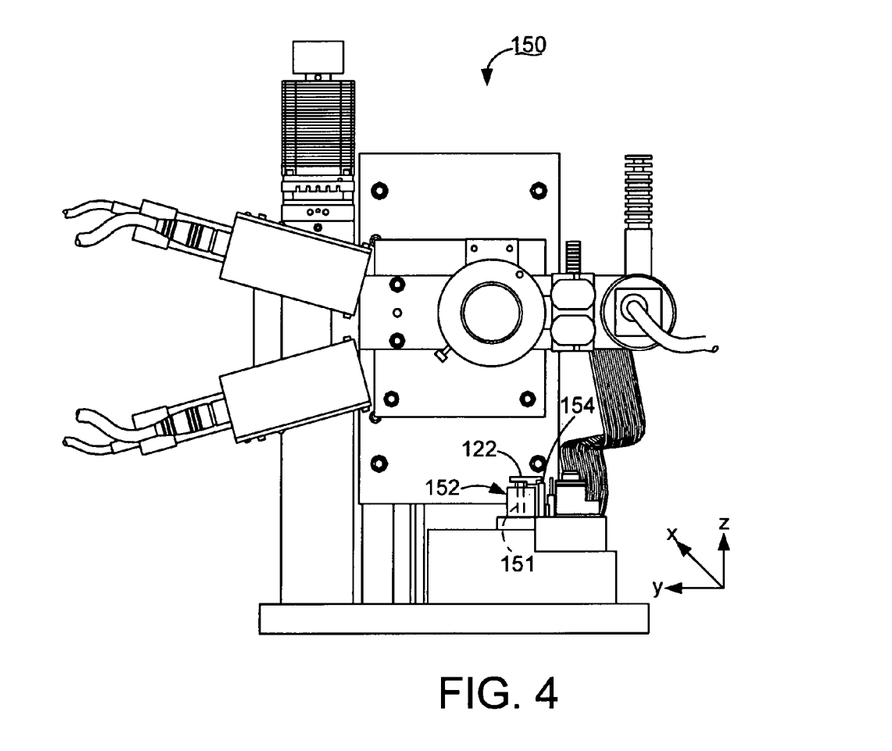
FIG. 4 is an elevational view of instrumentation constructed in accordance with embodiments of the present invention.

FIG. 4 is an elevational depiction of a measurement apparatus 150 that is constructed in accordance with embodiments of the present invention. Generally, the apparatus 150 is configured for measuring spatial characteristics of a complex test object such as the HSA 122. The apparatus 150 has a locating fixture 152 for securely positioning the HSA 122 during testing. In the embodiments of FIG. 4 the locating fixture 152 grippingly engages the rotatable spindle of the bearing 114 so that the HSA 122 is freely rotatable in the x-y plane.

Figure 5:
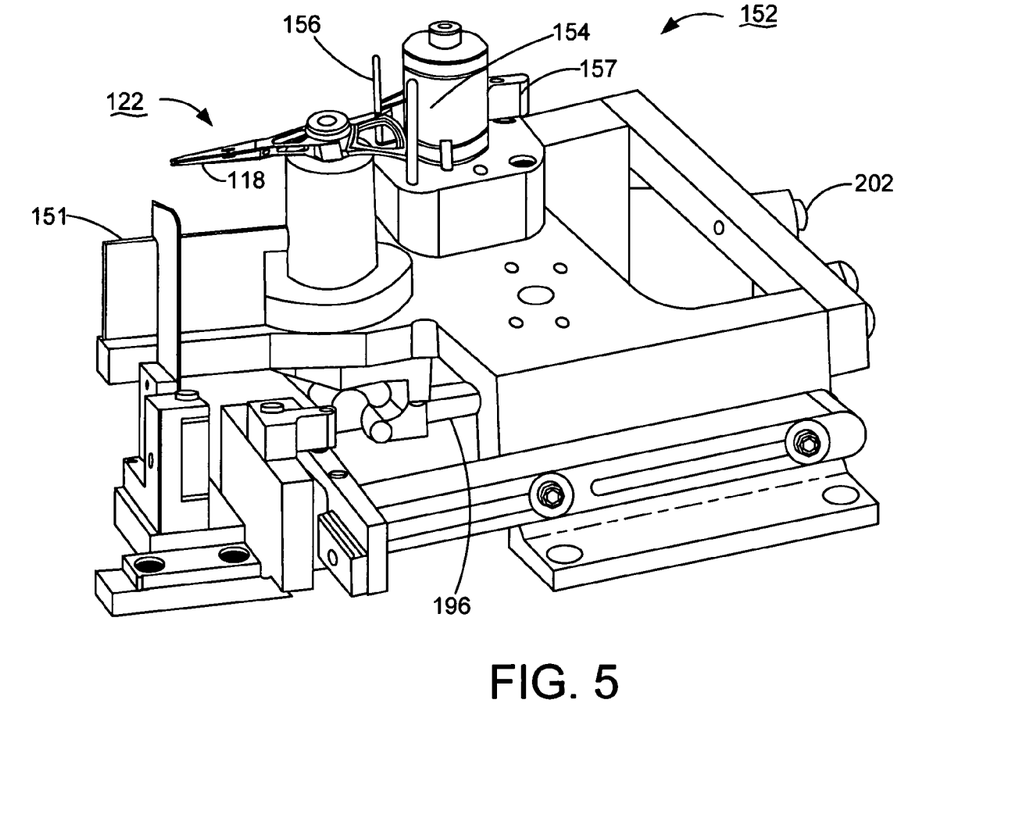
FIG. 5 is an isometric view of the fixture assembly of the instrumentation of FIG. 4.

FIG. 5 is an isometric view depicting the HSA 122 fixtured on the locating fixture 152. A clocking pin 154 is provided to abuttingly engage the HSA 122 where the suspensions 118 are longitudinally aligned with a reference object 151. A clocking member 156 is provided with a thumb lever 157 for the operator (or automated process) to press against in a counterclockwise direction, thereby pressingly locating the HSA 122 against the clocking pin 154 in rotation about the x-y plane.

Figure 6:
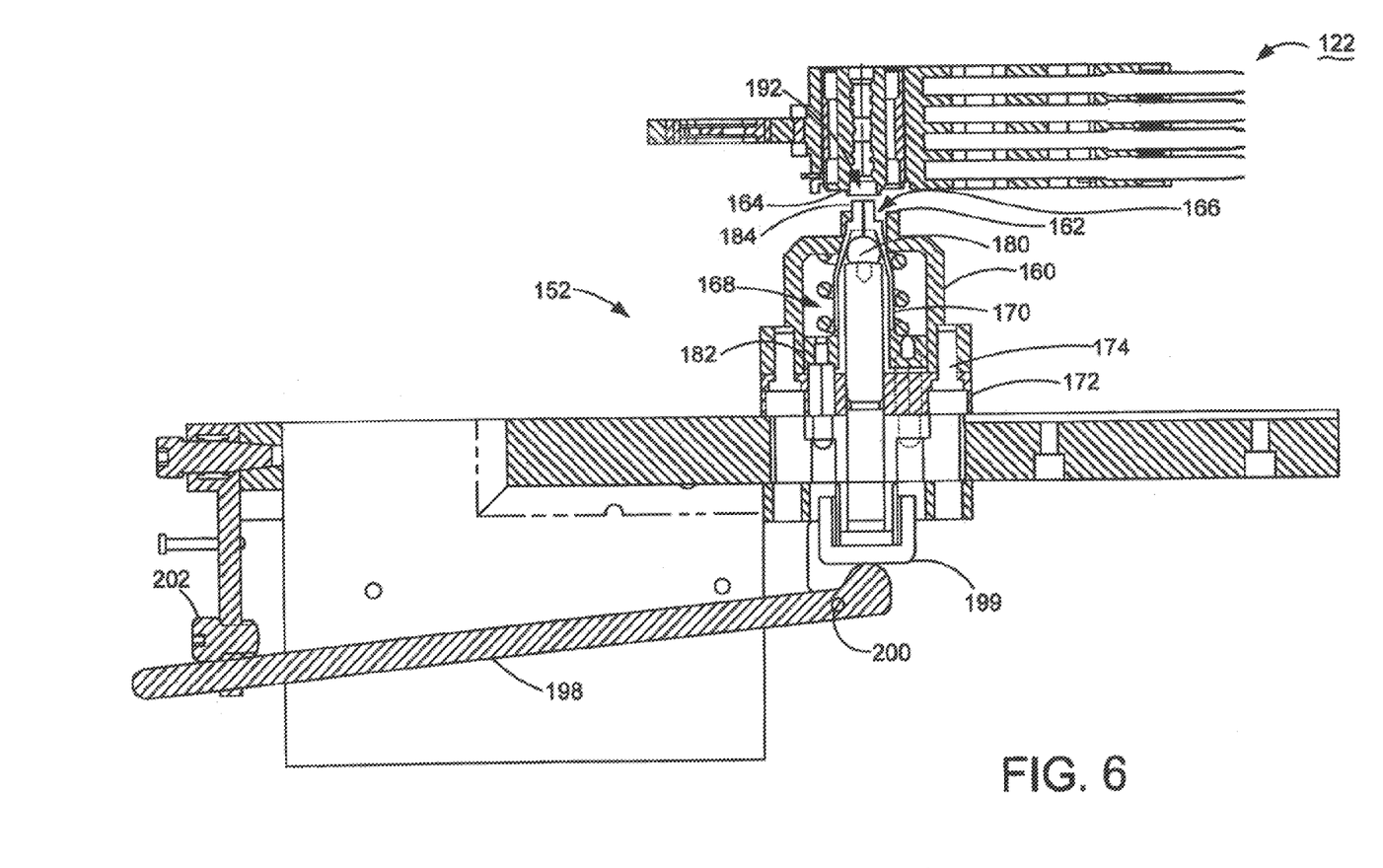
FIG. 6 is a cross sectional view of a portion of the fixture assembly of FIG. 5 in the retracted mode.
Figures 7, 8:
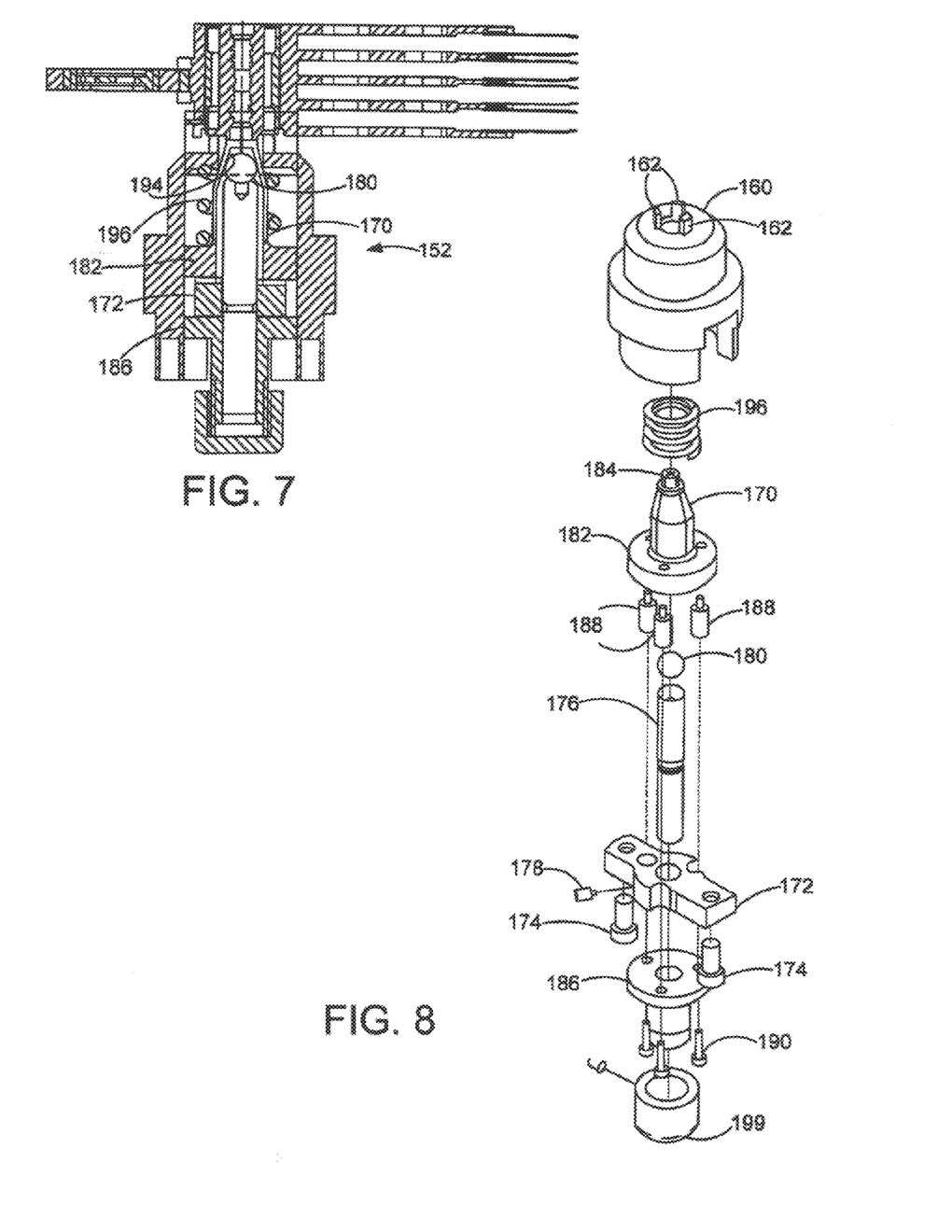
FIG. 7 is a cross sectional view of a portion of the fixture assembly of FIG. 5 supporting the head spindle assembly.
FIG. 8 is an exploded isometric view of a portion of the fixture assembly of FIG. 5.

FIG. 6 is a cross sectional view similar to FIG. 5 depicting the HSA 122 being lowered toward the locating fixture 152 which is in a retracted mode. FIG. 7 is a cross sectional view of a portion of the fixture 152 after having been switched to an expanded mode whereby the HSA 122 is cantilevered from the fixture 152 by simultaneous lateral and longitudinal fixturing forces.

The fixture 152 has a housing 160 defining a tooling datum surface 162. Preferably, the tooling datum surface 162 is annularly shaped and sized to matingly engage a datum surface 164 of the cartridge bearing portion of the HSA 122. The tooling datum surface 162 does not have to be continuous, and in fact preferably it is segmented by voids 166 so that the tooling datum surface 162 makes multi-point contact rather than a continuous contact with the HSA 122. Preferably, the tooling datum surface 162 makes a three-point contacting engagement with the cartridge bearing datum surface 164.

Continuing with FIGS. 6 and 7 and additionally with the exploded isometric view of FIG. 8, the housing 160 defines a passage 168 within which a collet 170 is longitudinally slidable. A shaft support 172 is fixed to the housing 160 by fasteners 174 and fixes, in turn, a shaft 176 via a set screw 178 in a longitudinal disposition within the passage 168. In these illustrative embodiments a distal end of the shaft 176 supports a spherical member 180 for operating the collet 170. In alternative equivalent embodiments the distal end of the shaft 176 could itself define a surface for this purpose.

The collet 170 has an annular bushing 182 and a plurality of segmented members depending from the bushing 182. Distal ends of the segmented members define segmented gripping members 184. The bushing 182 slidingly engages the shaft 176 in a close mating engagement, with the segmented members cylindrically disposed around the spherical member 180. For additional sliding support another bushing 186 is spatially disposed from the bushing 182, opposite the shaft support 172, via standoff members 188 and fixed together via fasteners 190. Like the bushing 182, the bushing 186 is sized to slidingly engage the shaft 176 in a close mating engagement.

In the upwardly disposed position of the collet 170 shown in FIG. 6 the segmented members clearingly disengage the spherical member 180, moving the gripping members 184 to the retracted mode. In the retracted mode the gripping members 184 define a protuberant feature that is sized to clearingly disengage a cavity 192 in the cartridge bearing 114 of the HSA 122. Particularly in the illustrative embodiments, the cavity 192 is an internally threaded portion of the cartridge bearing 114 that is otherwise used to attach the HSA 122 in the device 100. Preferably, the gripping members 184 in the retracted mode are sized to be receivingly engageable in a counterbore portion of the internally threaded feature.

With the HSA 122 disposed on the fixture 152 as shown in FIG. 7, the collet 170 is then displaced downward so that a tapered surface 194 of the collet 170 contactingly engages the spherical member 180. This urges the gripping members 184 outwardly, transitioning the collet 170 to the expanded mode. In the expanded mode the expansion of the gripping members 184 provides a contacting engagement with the HSA 122. A longitudinal force associated with continued downward movement of the collet 170 is transferred by this contacting engagement to ultimately pressingly engage the cartridge bearing datum surface 164 against the tooling datum surface 162. These simultaneous lateral and longitudinal forces are adequate to fixture the HSA 122 in a cantilevered supporting engagement.

A bias member is preferably provided to exert the longitudinal force urging the collet 170 to the expanded mode. In the illustrative embodiments a coil spring 196 is trained around the collet 170 and compressingly sandwiched between the housing 160 and the bushing 182 to exert opposing tensile forces thereto. A lever 198 (FIG. 6) is selectively pivotable around a pivot 200 to impart a force to the bushing 182 opposing the spring 196. In the illustrative embodiments a distal end of the lever 198 contactingly engages a cap 199 attached to a lower end of the bushing 186. The lever force is thereby transferred to the bushing 182 via the standoff members 188. FIG. 6 shows the lever 198 being retained by a latch 202 in a position corresponding to placing the collet 170 in the retracted mode. Unlatching the lever 198 permits the spring 196 to bias the collet 170 to the expanded mode.

Preferably, the cap 199 is longitudinally positionable to adjust the effective length between the lever 198 distal end and the bushing 182. This makes it possible to adjust the lever 198 stroke, and thereby the resulting force with which the spring 196 acts in moving the collet 170 to the expanded mode. In the illustrative embodiments the cap 199 can threadingly engage the lower end of the bushing 186 for this purpose.

The illustrative embodiments thus enable a method for precisely fixturing the HSA 122. First, the spring-loaded collet 170 is retained in the retracted position by latching the lever 198. The protuberant gripping members 184 of the collet 170 can then be receivingly engaged into the cavity 192 defined by the HSA 122. When appropriate, the lever 198 is then unlatched, permitting the collet 170 to longitudinally displace and simultaneously contactingly engage against the cavity 192 to laterally and longitudinally fix the HSA 122 in a cantilevered engagement.

As described, preferably the protuberant gripping members 184 define a cylindrical feature that pressingly engages against a counterbore portion of the cavity 192. The method is ultimately deemed complete when the cartridge bearing datum surface 164 abuttingly engages against the tooling datum surface 162. However, it has been observed during reduction to practice of the present embodiments that superior positioning is best achieved if these two datums 162, 164 are not engaged in the unencumbered placement of the HSA 122 on the fixture 152. FIGS. 9-12 illustrate how these datums 162, 164 are ultimately brought together in accordance with embodiments of the present invention.

Figures 9, 10, 11, 12:
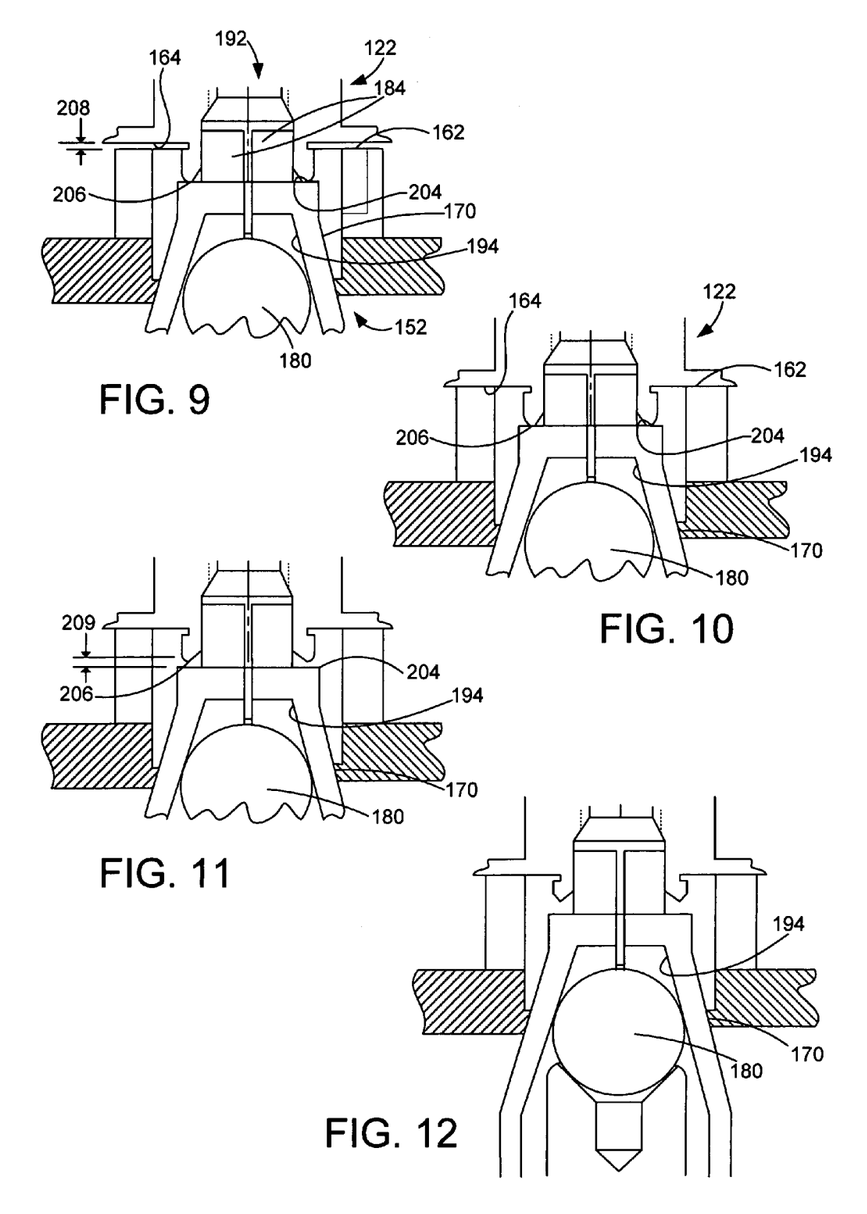
FIGS. 9-12 illustrate incremental steps in moving the fixture assembly of FIG. 5 from the retracted position to the expanded position.

In FIG. 9 the HSA 122 is shown in the unencumbered state on the fixture 152. That is, the collet 170 is latched in the retracted mode, such that the gripping members 184 clearingly disengage the counterbore of the cavity 192, and the tapered surfaces 194 clearingly disengage the spherical member 180. It will be noted that in this retracted mode a bearing shaft flange 206 abuttingly engages a collet flange 204 in supporting the HSA 122 on the fixture 152. This desirably leaves a clearance denoted by 208 between the cartridge bearing datum surface 164 and the tooling datum surface 162.

In FIG. 10 the collet 170 is unlatched and has moved downwardly but the tapered surfaces 194 are still clearingly disengaged from the spherical member 180. The weight of the HSA 122 urges it downward in conjunction with the collet 170 movement. At this point both the datum surfaces 162, 164 first come into abutting engagement at a time when the bearing shaft flange 204 and the collet flange 206 remain abuttingly engaged.

In FIG. 11 the collet 170 has moved further downward to reach the first contacting engagement between the tapered surfaces 194 and the spherical member 180. Note that prior to reaching this longitudinal position, the collet flange 206 has separated from the bearing shaft flange 204 by a gap denoted by the reference 209. This permits the datum surfaces 162, 164 to abuttingly engage precisely.

Finally, in FIG. 12 the collet 170 has moved further downward to achieve a desired contacting engagement between the tapered surfaces 194 and the spherical member 180. That contacting engagement results in the desired contacting engagement by the gripping members 184, as well as the desired longitudinal force transferred by the contacting engagement, which cooperatively impart adequate lateral and longitudinal forces to fixture the HSA 122 in a cantilevered support thereof.

Some embodiments of the present invention contemplate instrumentation for precisely fixturing a head stack assembly having a housing supporting a collet defining a surface sized to provide unencumbered support to the head stack assembly, and means for cantilevering the head stack assembly against the housing with simultaneous longitudinal and lateral fixturing forces. For purposes of this description and meaning of the appended claims, "means for cantilevering" expressly contemplates the described structure and equivalents thereof that permit attaching only one side of the head stack assembly to the housing for positive positioning purposes, such as for measurement or testing procedures performed on the head stack assembly. The term "means for cantilevering" expressly does not contemplate other attempted solutions that do not cantilever the head stack assembly from the housing datum surface, such as but not limited to previous attempted solutions that provide a top clamp that compressingly engages against the top side of the head stack assembly.

The skilled artisan will readily recognize the distinguishing advantages of the contemplated embodiments that provide complete unrestricted access to the cantilevered test object for processing purposes. The cantilevered attachment action furthermore provides not only an effective means for fixing the test component, but also a solution that is optimally efficient for maximum throughput velocity. Furthermore, optimal process results are obtained by attaching to the test component in a manner similar to how the component is ultimately attached in the final assembly.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to a moving media data storage device, it will be appreciated by those skilled in the art that the claimed subject matter is not so limited and various other systems can utilize the present embodiments without departing from the spirit and scope of the claimed invention.

What is claimed is:

1. An apparatus for positioning a component, the apparatus comprising:
    a longitudinally extending housing;
    a collet supported by the housing and having a plurality of segmented gripping members that are selectively moveable relative to the housing to different longitudinal positions differentiating a first mode at a first longitudinal position, where the gripping members are radially retracted establishing a clearing disengagement from the component, and a second mode at a different second longitudinal position, where the gripping members are radially expanded establishing a contacting engagement against the component;
    a latch that is selectively activated to retain the gripping members in the first mode; and
    a bias spring responsive to deactivating the latch to impart a longitudinal force urging the gripping members to the second mode and maintaining the longitudinal force in the second mode so the longitudinal force transfers to the component via the contacting engagement of the gripping members against the component in the second mode of the gripping members.

2. The apparatus of claim 1 wherein the housing defines a passage within which the collet is longitudinally slidable.

3. The apparatus of claim 2 wherein the collet has an annular bushing and the plurality of longitudinally segmented gripping members extend from the bushing.

4. The apparatus of claim 3 wherein the coils defines a tapered surface that is configured to contactingly engage a longitudinal shaft supported by the housing in the passage, thereby deflecting the gripping members in relation to longitudinal movement of the collet in the passage.

5. The apparatus of claim 4 wherein the gripping members extend from a bushing sized to slidingly engage the shaft in a close mating engagement.

6. The apparatus of claim 5 wherein the bias member exerts opposing tensile forces against the bushing and against the housing.

7. The apparatus of claim 6 comprising a cap that is longitudinally positionable to define an effective length of the bushing.

8. The apparatus of claim 7 wherein the cap threadingly engages the bushing.

9. The apparatus of claim 8 wherein the bias spring comprises a coil spring trained around the collet and compressingly disposed between the bushing and the housing.

10. The apparatus of claim 2 further comprising a tooling datum surface defining an annular surface circumscribing the passage.

11. The apparatus of claim 10 wherein the tooling datum surface is segmented.

12. The apparatus of claim 1 comprising a lever that is selectively moveable to impart a force opposing the bias member to longitudinally move the gripping members between the retracted mode and the expanded mode.

13. The apparatus of claim 10 wherein the tooling datum surface is sized to matingly engage a cartridge bearing surface of a head stack assembly.

14. The apparatus of claim 13 wherein the head stack assembly defines a cavity, and the gripping members cooperatively define a protuberant feature that is sized in the retracted mode to be receivingly engaged in the cavity.

15. The apparatus of claim 14 wherein the cavity defines an internally threaded feature.

16. The apparatus of claim 14 wherein the protuberant feature grippingly engages a counterbore portion of the cavity in the expanded mode.

17. An apparatus for positioning a component, the apparatus comprising:
- a housing defining a longitudinal passage:
- a collet having a bushing that is longitudinally slidable on a shaft in the passage and having a plurality of segmented gripping members extending from the bushing that are selectively moveable relative to the housing to different longitudinal positions differentiating a first mode, where the gripping members are radially retracted establishing a clearing disengagement from the component, and a second mode, where a tapered surface of the gripping members contactingly engages the shaft to radially expand the gripping members thereby establishing a contacting engagement of the gripping members against the component:
- a latch that is selectively activated to retain the gripping members in the first mode; and
- a bias spring trained around the collet and compressingly disposed between the bushing and the housing, thereby responsive to deactivating the latch to urge the gripping members to the second mode and maintain the longitudinal force in the second mode so the longitudinal force transfers to the component via the contacting engagement of the gripping members against the component in the second mode of the gripping members.

* * * * *

UNITED STATES PATENT AND TRADEMARK OFFICE
CERTIFICATE OF CORRECTION

PATENT NO. : 7,694,411 B2  Page 1 of 1
APPLICATION NO. : 11/789491
DATED : April 13, 2010
INVENTOR(S) : Sham Sunder Nayar et al.

It is certified that error appears in the above-identified patent and that said Letters Patent is hereby corrected as shown below:

In Col. 7, line 4
replace "the coils"
with "the collet."

Signed and Sealed this

Twentieth Day of July, 2010

David J. Kappos
*Director of the United States Patent and Trademark Office*